United States Patent [19]

Driedger

[11] 4,450,657
[45] May 29, 1984

[54] PRE-FABRICATED GRAIN ELEVATOR

[75] Inventor: Klaus U. Driedger, Edmonton, Canada

[73] Assignee: ABL Engineering Ltd., Calgary, Canada

[21] Appl. No.: 411,569

[22] Filed: Aug. 25, 1982

Related U.S. Application Data

[62] Division of Ser. No. 109,503, Jan. 4, 1980, Pat. No. 4,362,453.

[30] Foreign Application Priority Data

Sep. 26, 1979 [CA] Canada ................................ 336363

[51] Int. Cl.³ .............................................. E04H 7/00
[52] U.S. Cl. ...................................... 52/79.9; 52/79.2; 52/608; 52/195
[58] Field of Search .................. 52/259, 258, 276, 283, 52/564, 606, 195, 197, 608, 79.2, 79.9; 193/2 A, 2 R; 405/108, 118, 119, 125

[56] References Cited

U.S. PATENT DOCUMENTS

| 867,962 | 10/1907 | Finton . |
| 2,330,642 | 9/1943 | Tuttle . |
| 3,724,141 | 4/1973 | Kelleher ........................ 52/79.14 X |
| 4,205,936 | 6/1980 | Green . |

FOREIGN PATENT DOCUMENTS 885272  9/1943  France .................................. 52/198

Primary Examiner—Henry E. Raduazo
Attorney, Agent, or Firm—Cushman, Darby & Cushman

[57] ABSTRACT

A grain elevator utilizing pre-cast concrete elements includes a plurality of vertical zone rows of bins, which slope from front to back at an angle of approximately 30°, the front ends of the bins being located above office, receiving, grain cleaning or shipping and agro-product warehouse space; a tower or cowl at the front end of the elevator housing bucket elevator heads and distribution conveyors for loading the bins; a discharge manifold for removing the grain from the lower, rear ends of the bins, and conveyors for delivering the grain to trucks or to bins for feeding the grain into railway cars.

3 Claims, 27 Drawing Figures

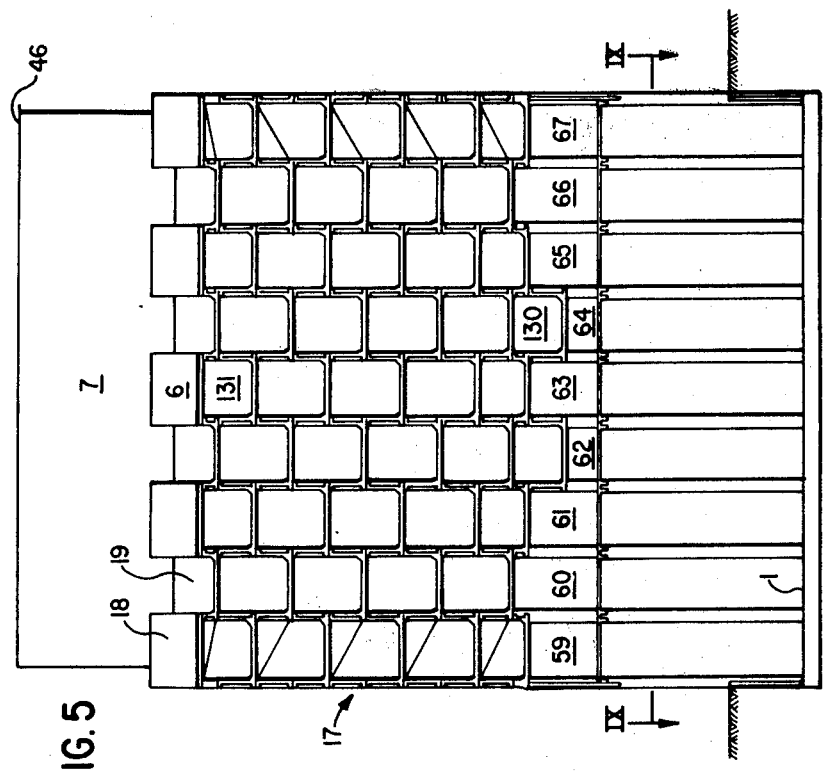
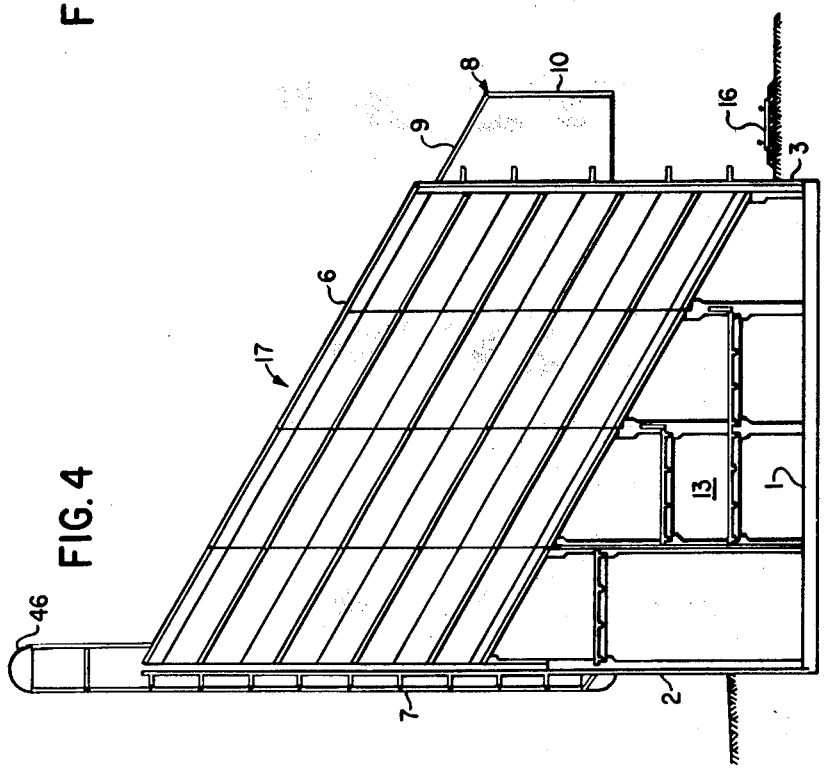

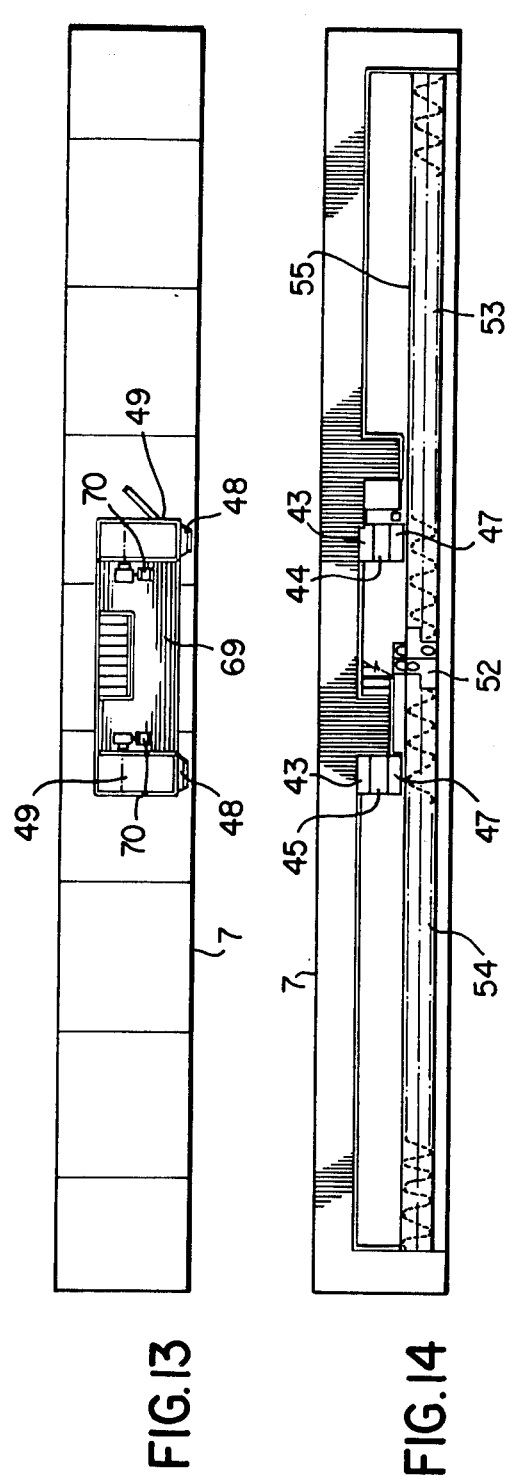
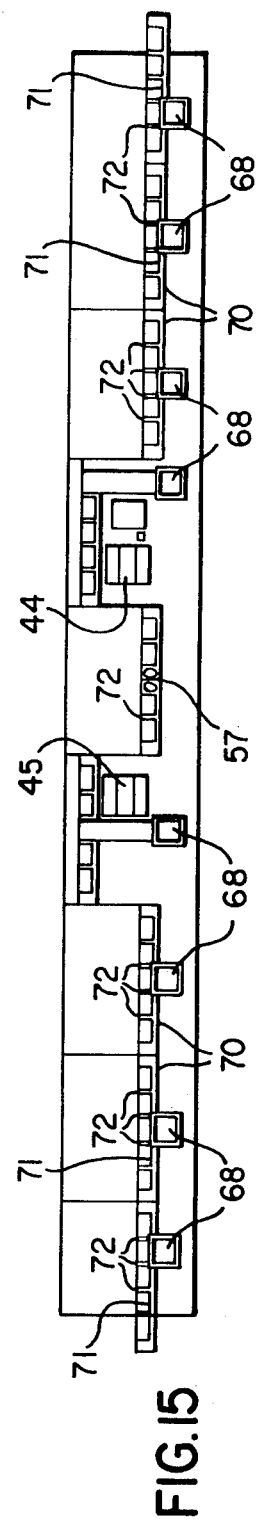
FIG. 13
FIG. 14
FIG. 15

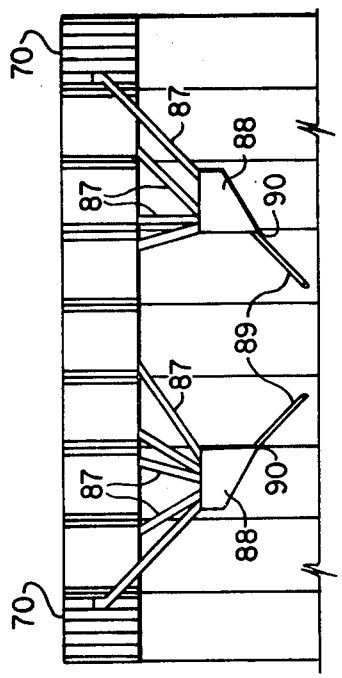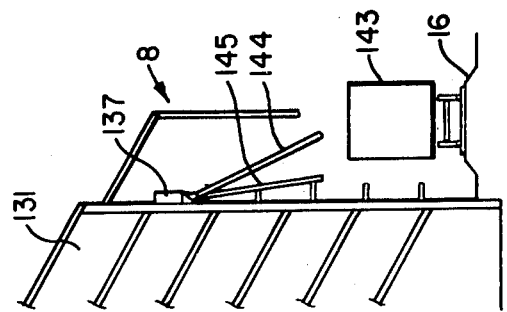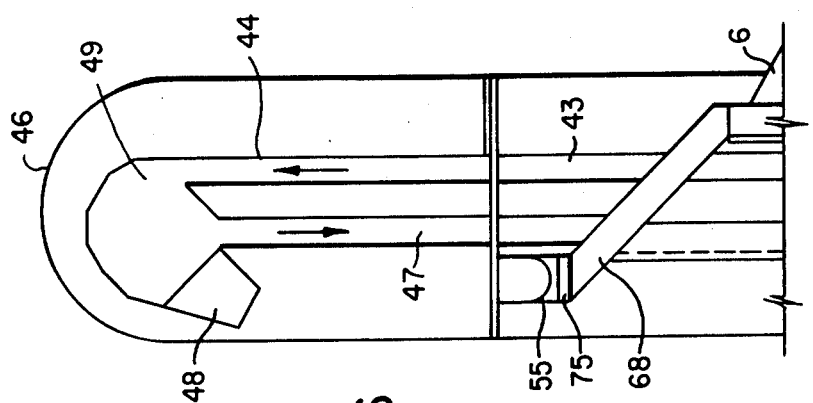

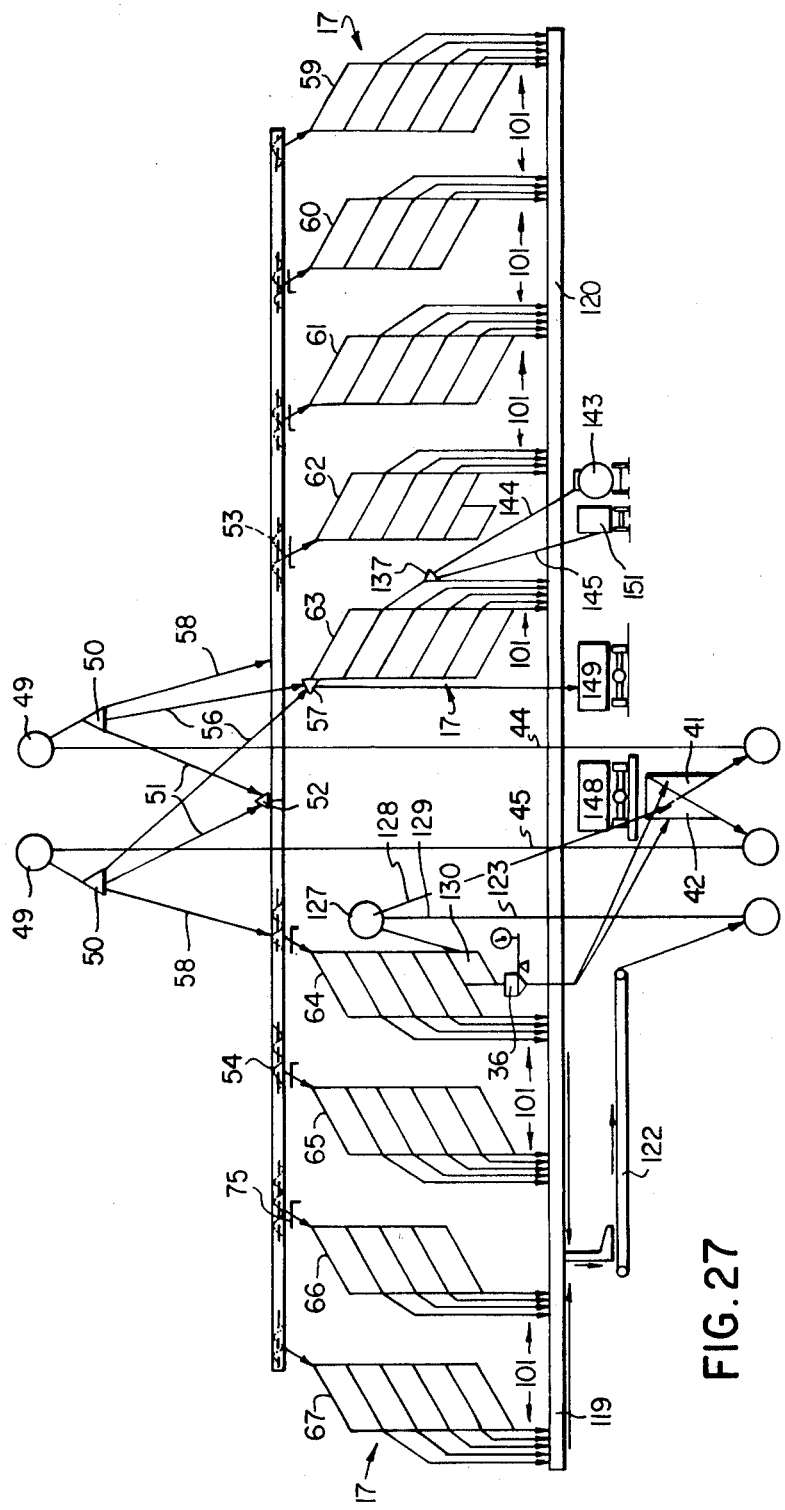

PRE-FABRICATED GRAIN ELEVATOR

CROSS REFERENCE TO RELATED APPLICATIONS

This application is a division of my earlier copending application Ser. No. 109,503 filed Jan. 4, 1980, now U.S. Pat. No. 4,362,453.

BACKGROUND OF THE INVENTION

This invention relates to an elevator for storing granular material, and in particular to a grain elevator.

In the following description and appended claims, the term granular material is intended to mean any grain-like material such as those stored in silos or grain elevators. While the primary purpose of the elevator is for storing grain, it can also be used for storing other granular materials such as bulk fertilizer.

The grain elevator art has been and is relatively static, i.e. the basic design of grain elevators has not changed substantially for many years. A search in the grain elevator art discloses little prior art. Such art includes U.S. Pat. Nos. 218,214, issued to W. Watson on Jul. 10, 1883; 867,962, issued to W. L. Finton on Oct. 15, 1907; 1,580,073, issued to W. 0. Nothnagel on Apr. 6, 1926; and 3,931,877, issued to L. L. Albaugh on Jan. 13, 1976.

One of the problems posed by existing grain elevators is that they represent a fire hazard. If a fire starts in one section of the elevator, it quickly spreads throughout the whole elevator. Another problem is that, in general, grain elevators, regardless of their size, are constructed completely on site, i.e. the entire structure is produced at the location where the elevator is desired. Thus, a large work force and vast quantities of material must be provided at the site.

The object of the present invention is to alleviate at least partially the above-mentioned problems by providing a simple modular elevator structure, the modules of which can be prefabricated, and which prevent fire spreading throughout the elevator.

SUMMARY OF THE INVENTION

Accordingly, the present invention relates to an elevator for storing granular material comprising a plurality of parallel, vertically extending rows of inclined bins, each bin being discrete with respect to all adjacent bins; first wall means closing the upper ends of said bins; second wall means closing the lower ends of said bins; feed means for individually loading each bin in each vertical row at the upper end thereof with granular material; and normally closed discharge means for individually unloading each said bin in each vertical row at the lower end of the bin.

More specifically, the invention relates to a grain elevator comprising a building defined by a base, a top wall, front and rear side walls and a pair of end walls; a plurality of parallel, vertically extending rows of bins extending between said front and rear side walls; feed means for individually loading each bin in each vertical row at the upper end thereof with grain; a normally closed discharge means for individually unloading each said bin in each vertical row at the lower end of the bin.

The bins are defined by modules in the form of preformed, reinforced concrete sections, which are readily interconnected at a site for quick construction of an elevator. In the preferred form, the sections and consequently the bins are rectangular in cross-sectional configuration, with a bottom wall and integral side walls. When the sections are interconnected end-to-end, they form an elongated bin. A plurality of bins are stacked one on top of another to form a vertical row of bins, the top of each bin being closed by a superjacent bin, the tops of the uppermost bins being closed by a roof.

In order to enable the stacking defined above, a connector is provided at each end of each bin section. The connector is defined by a rectangular bearing block at each end of and integral with each side of a bin section. The sides of the bearing block are parallel to the ends of the section side to which the block is attached. The ends of the block are inclined with respect to the base or web of the bin section and perpendicular to the ends of the sides of the bin sections. Thus, when the sections are stacked vertically to form inclined bins, the bearing blocks are vertically oriented, i.e. the sides of the blocks are disposed in vertical planes and the ends of such blocks are disposed in horizontal planes.

Prefabricated end walls at the upper and lower ends of the bins incorporate the feed means and discharge means, respectively. The feed means includes a vertical passage in a precast feed manifold for each vertical row of bins. The discharge means includes a discharge manifold for each vertical row of bins, the manifold having a separate vertically extending channel or passage for each bin.

Grain carried into the elevator in trucks is weighed, and then fed into receiving pits.

Bucket conveyors carry the grain to the top frontend of the elevator where the grain is distributed along the length of the elevator by screw conveyors. The screw conveyors carry the grain to the top ends of feed chutes for feeding the grain into vertical loading passages in the precast feed manifolds in the front wall of the elevator. A plug is slidably mounted in each loading passage for successively opening feed openings in the upper, rear ends of the bins in a vertical row of bins. The ends of a chain or cable are connected to the top and bottom of the plug, the chain passing around pulleys or sheaves mounted at the top and bottom ends of the loading passage. One of the pulleys is driven by a motor or manually, so that the plug can be raised or lowered at will. Thus, the bins are loaded individually at their upper front ends. Each feed manifold also includes a vertical overflow discharge passage parallel to the loading passage. As each bin is filled, grain overflows through an overflow opening in the upper rear end of the bin, and passes downwardly through spouts to an overflow bin. Grain in the overflow bin can be recirculated, i.e. returned to the receiving pits to be conveyed by the bucket conveyors to the top of the elevator.

The bins are unloaded into the discharge manifolds at the rear end of the elevator. The discharge manifolds feed the grain downwardly into discharge chutes, which carry the grain to a horizontal belt conveyor. The belt conveyor moves the grain to a shipping conveyor, and the latter carried the grain generally horizontally to the front of the elevator from whence the grain is fed upwardly via a vertical bucket elevator to one of the lower bins (hereinafter referred to as the shipping bin). Grain from the shipping bin is fed into a shipping scale for weighing, and returned to the top front of the elevator via the receiving pits and bucket conveyors. From the top front of the elevator, the grain is discharged to a truck or fed through a top centre discharge bin to a three-way valve at the top rear of the elevator, from whence the grain can be (a) discharged into box cars, (b) discharged into hopper cars, or (c) fed into the discharge manifold for return to the horizontal belt conveyor and recirculation via the horizontal shipping conveyor.

BRIEF DESCRIPTION OF THE DRAWINGS

The invention will now be described in greater detail with reference to the accompanying drawings, which illustrate a preferred embodiment of the invention, and wherein:

FIG. 4 is a cross-sectional view taken generally along line IV—IV of FIG. 3;

FIG. 5 is a cross-sectional view taken generally along line V—V of FIG. 2;

FIG. 13 is a cross-sectional view taken generally along line XIII—XIII of FIG. 12;

FIG. 14 is a cross-sectional view taken generally along line XIV—XIV of FIG. 12;

FIG. 15 is a cross-sectional view taken generally along line XV—XV of FIG. 12;

FIG. 16 is a cross-sectional view taken generally along line XVI—XVI of FIG. 12, with parts removed;

FIG. 21 is a schematic front view of the grain elevator with parts removed to illustrate an overflow system of the grain elevator;

FIG. 24 is a cross-sectional view of the rear end of the elevator taken generally along line XXIV—XXIV of FIG. 3;

FIG. 27 is a schematic flow diagram of the path followed by grain in the elevator of FIGS. 1 to 26.

DESCRIPTION OF THE PREFERRED EMBODIMENT(S)

General Description of Basic Structure

Figure 1:
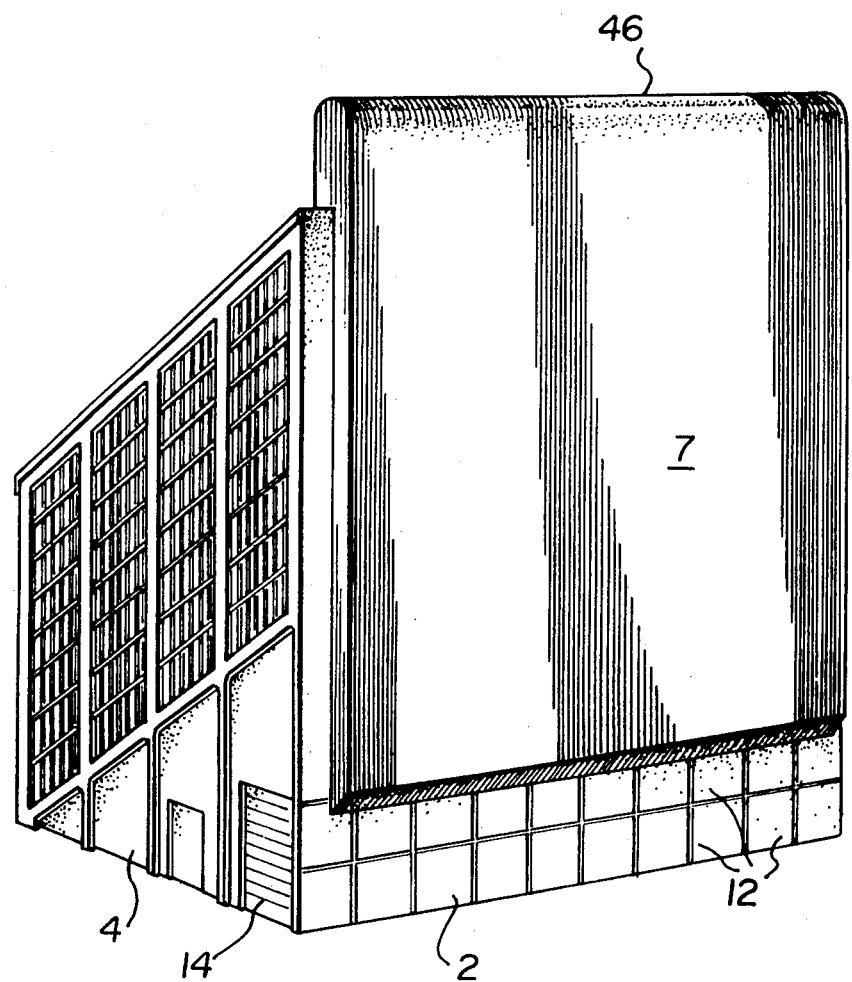
FIG. 1 is a schematic, perspective view from above and one end of a grain elevator in accordance with the present invention.
Figure 2:
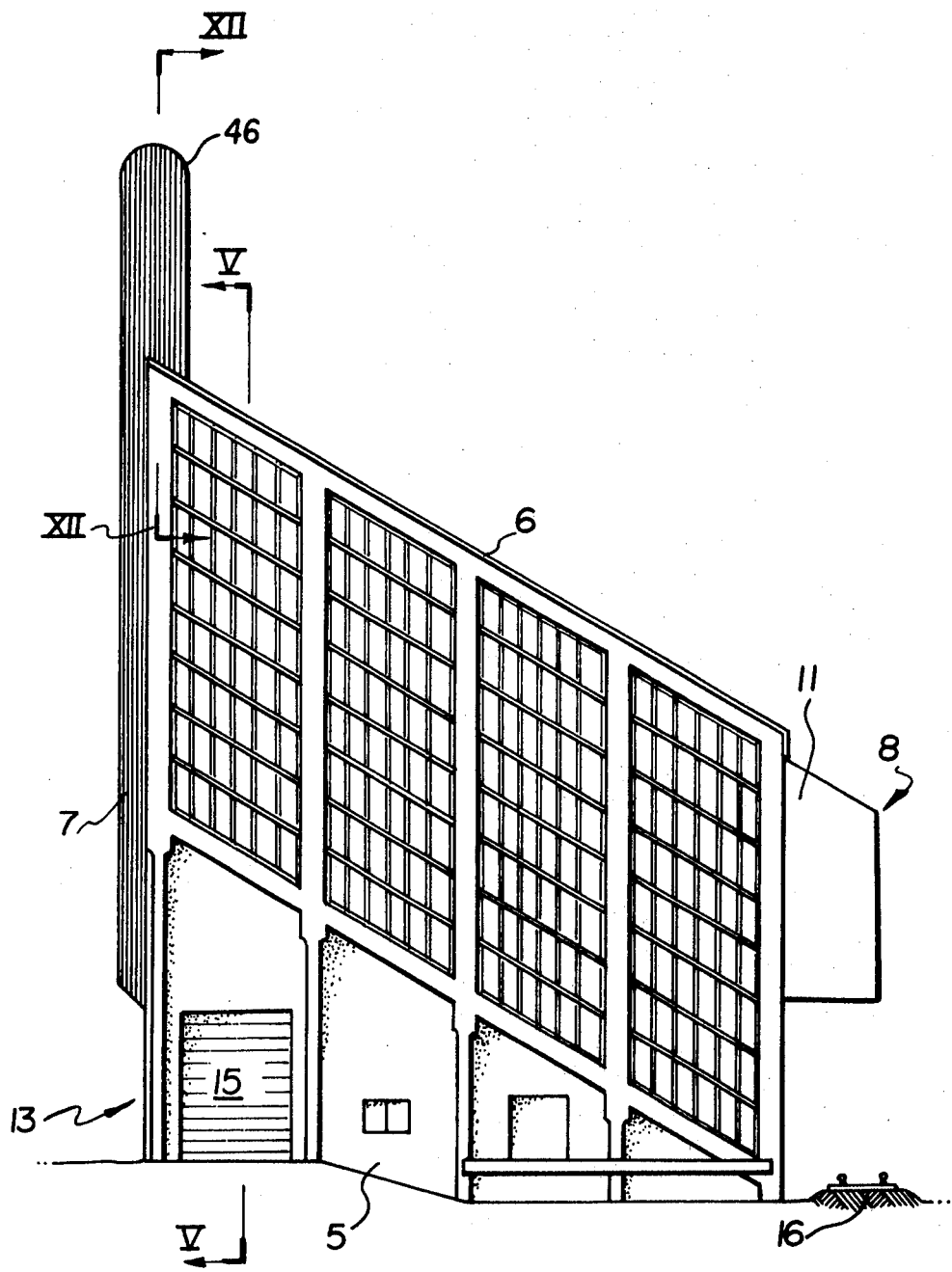
FIG. 2 is an end view of the grain elevator of FIG. 1, illustrating the end opposite that shown in FIG. 1.

It should be noted that in this specification the front and rear of the elevator have been arbitrarily chosen to facilitate comprehension.

With reference to the drawings and in particular to FIGS. 1 to 5, the grain elevator of the present invention is a building defined by a foundation or base 1, front and rear side walls 2 and 3, respectively, end walls 4 and 5, respectively, and an inclined roof or top wall 6. A cowl 7 extends along substantially the entire length of the front wall 2 and above the upper front end of the roof 6. An awning generally indicated at 8 extends outwardly from the rear wall 3 of the building along substantially the entire length thereof. The awning 8 has an open bottom end, and is defined by an inclined top wall 9, an outer wall 10 and end walls 11.

Except for the cowl 7 and the awning 8, which are formed of metal, the elevator is formed mainly of pre-cast concrete sections or panels. For example, the lower portion of the front wall 2 is formed by pre-cast panels 12. The lower area of the elevator is a service area generally indicated at 13 devoted to office, warehouse and retail space, weighing, cleaning and drying equipment and controls for operating the elevator. A truck (not shown) can enter door 14 (FIG. 1) at one end 4 of the building, unload grain and exit through door 15 (FIG. 2) in the other end wall 5 of the building. As described in greater detail hereinafter, trucks can be loaded with grain outside the front the front wall 2 of the elevator or train cars on rail siding 16 (FIGS. 2 and 4) can be loaded with grain at the rear of the building. The awning 8 covers the train cars during filling on the siding 16. The area above the service area 13 is occupied by a plurality of vertical rows of inclined bins generally indicated at 17 for storing grain or another granular material. The bins 17 are inclined from the front wall 2 to the rear wall 3 of the elevator. For the most part, the area under the front cowl 7 contains bin loading elements, and the area at the rear of the elevator contains bin emptying apparatus.

As best illustrated in FIG. 5, the parallel, vertical rows of bins 17 are formed by overlapping the bins in one row with the bins in the adjacent row, i.e. by resting one bottom side edge of one bin on the top side edge of a bin in the adjacent parallel row of bins. Thus, the bins 17 in one vertical row are vertically staggered with respect to the bins in the next vertical row, and on the same level as the bins in the following vertical row. The roof 6 of the elevator is formed by two different type of panels 18 and 19, so that the roof is inclined, with a crenelated cross-sectional configuration, i.e. the roof is defined by a series of parallel rectangular grooves alternating with parallel rectangular projections sloping rearwardly from the cowl 7 to the rear wall 3 of the building.

Details of Bin Structure

Figure 6:
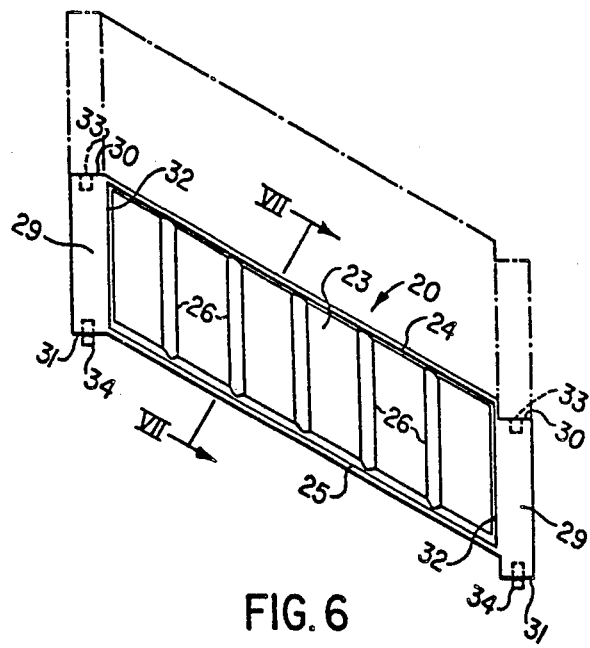
FIG. 6 is an elevation view of a bin section of the grain elevator.
Figure 7:
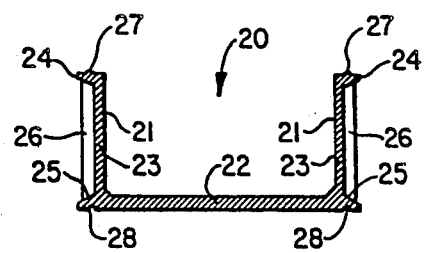
FIG. 7 is a cross-sectional view taken generally along line VII—VII of FIG. 6.
Figure 8:
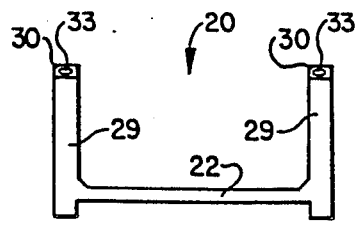
FIG. 8 is an end view of the bin section of FIGS. 6 and 7.

Referring to FIGS. 6 to 8, the bins 7 are formed by reinforced concrete sections generally indicated at 20. Each bin section 20 is in the form of an elongated, generally U-shaped trough defined by planar, vertical sides 21 joined by a bottom web 22. Each side 21 includes a central panel 23. An outwardly projecting flange 24 extends along the top of the panel 23, a similar flange 25 extends along the bottom of the panel, and reinforcing ribs 26 extend between the flanges 24 and 25. The top flange 24 is provided with a small, longitudinally extending ridge 27, and the bottom flange includes a small, longitudinally extending groove 28. When the sections 20 are stacked, the ridges 27 and recesses 28 fit together to provide a stable seal.

The ends of each side 21 (upper and lower ends when the section is in the inclined position) are provided with rectangular bearing blocks 29. The bearing blocks 29 are integral with the ends of the sides 21 of the bin section 20. Each bearing block 29 has sides parallel to the ends or sides of the side 21 to which the bearing block is attached. Top and bottom ends 30 and 31, respectively of each bearing block 29 are inclined with respect to the web 22 and perpendicular to ends 32 of the sides 21, so that when the bin sections 20 are stacked vertically to form inclined bins 17, the bearing blocks 29 are vertically oriented for supporting the maximum load. The top end 30 of each bearing block 29 is provided with a cylindrical recess 33 for receiving a pin 34 in the bottom end of a superjacent bearing block 29. Of course, other forms of connectors can be used including the use of cast in place of concrete sections. Also, a recess can be provided in the top and bottom of each bearing block 29, and dowels inserted in the recesses to connect the bin sections.

Grain Receiving Apparatus

Figure 9:
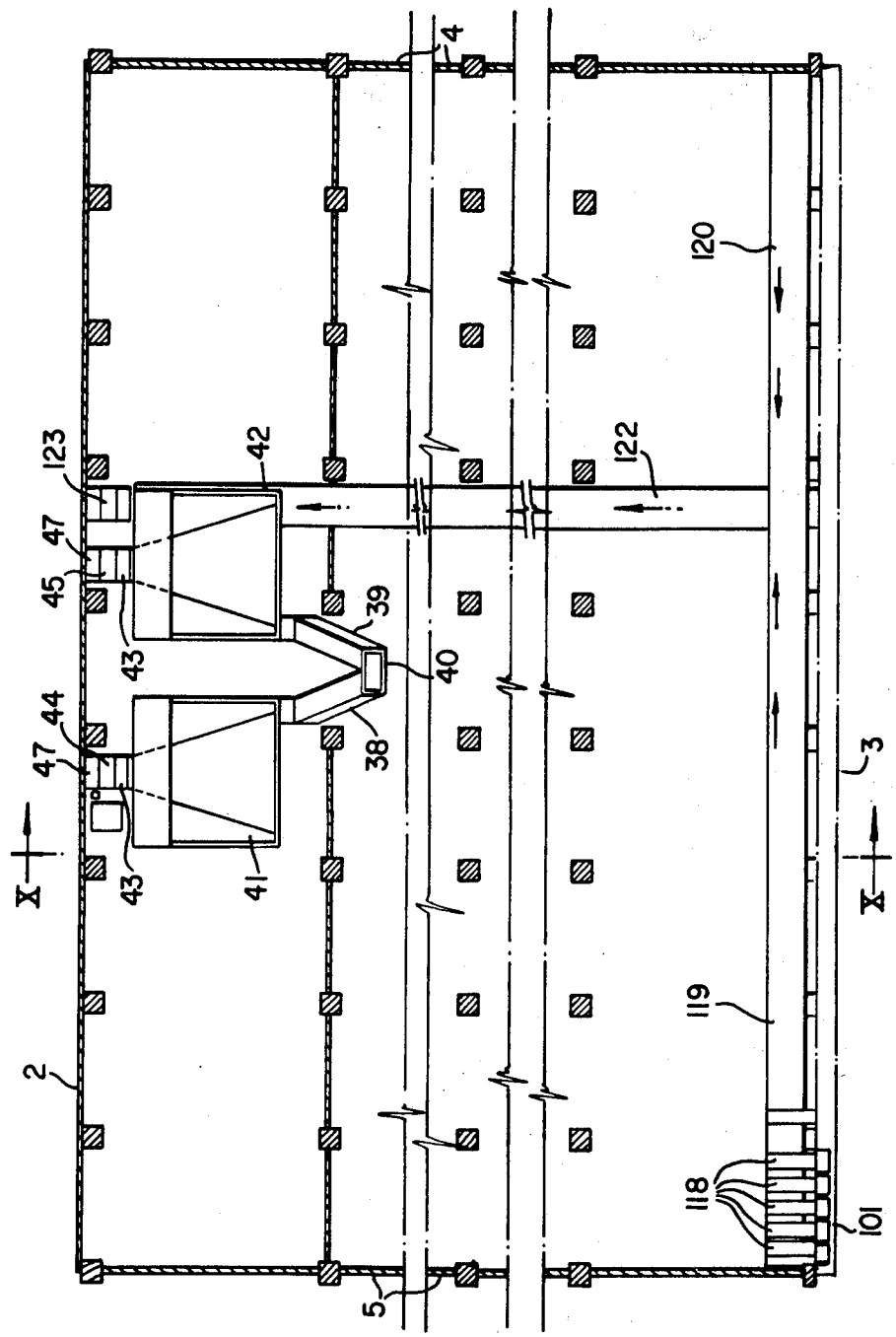
FIG. 9 is a cross-sectional view of the grain elevator taken generally along line IX—IX of FIG. 3, illustrating portions of grain receiving, feeding and discharge elements.
Figure 11:
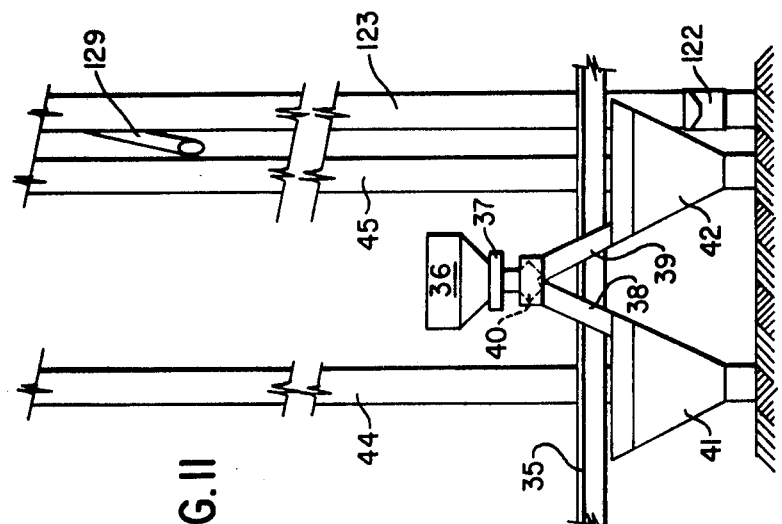
FIG. 11 is a cross-sectional view of a section of the elevator taken generally along line XI—XI of FIG. 10.
Figure 10:
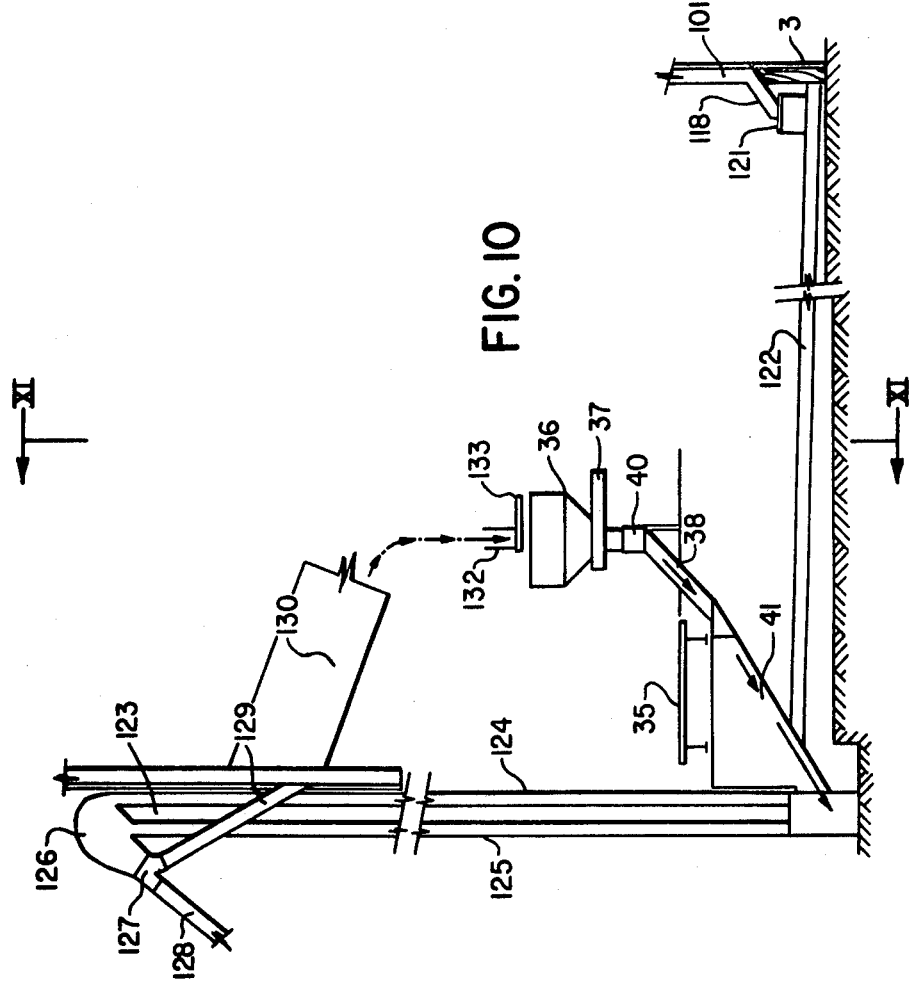
FIG. 10 is a cross-sectional view of the elevator taken generally along line X—X of FIG. 9.

Referring to FIGS. 9 to 11, a truck (not shown) carrying grain upon entering the building stops on a truck scale 35. A grain scale 36 is mounted on a support 37 in the area of the truck lane. As described in greater detail hereinafter, grain being weighed (for discharge) passes downwardly from the scale 36 via arms 38 and 39 of a chute 40 into the receiving pits 41 and 42. Grain from the truck is dumped into one of receiving pits 41 or 42. Grain flowing from the bottom of the receiving pits 41 or 42 enters one arm or front leg 43 of vertical bucket elevator 44 or 45. The bucket elevators 44 and 45 contain bucket conveyors (not shown) for carrying the grain to the top of the elevator, i.e. upwardly into top end 46 of the cowl 7. The conveyor travels up the arm 43 and returns to the bottom of the elevator via arm 47.

Figure 12:
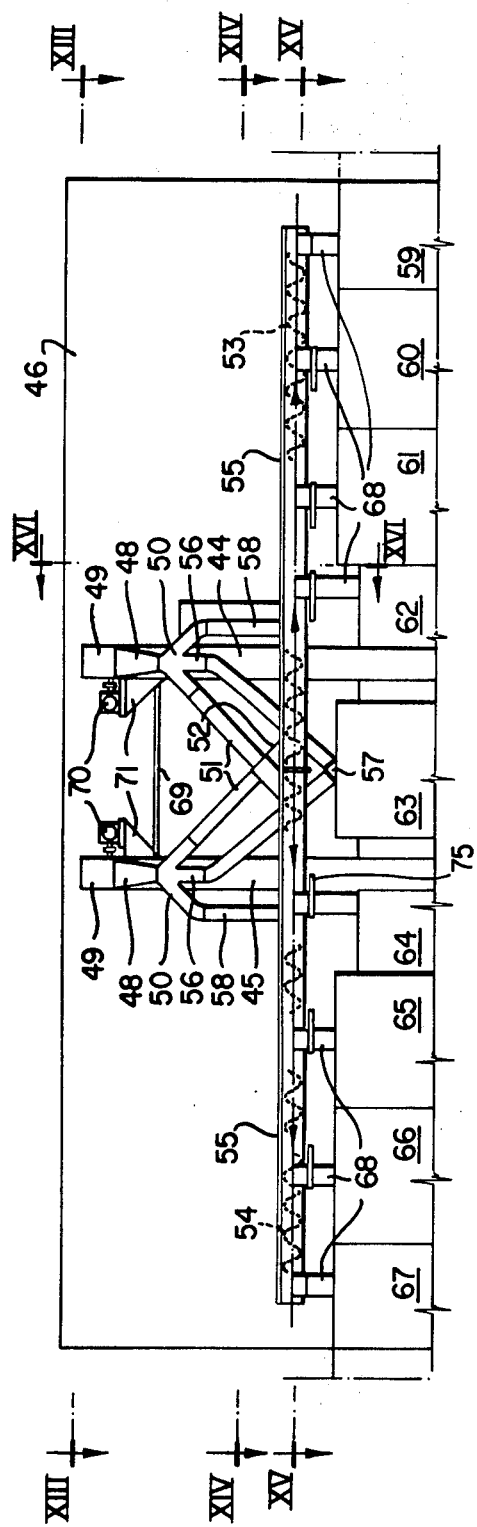
FIG. 12 is a cross-sectional view of the upper front end of the grain elevator with parts removed taken generally along line XII—XII of FIG. 2.
Figure 23:
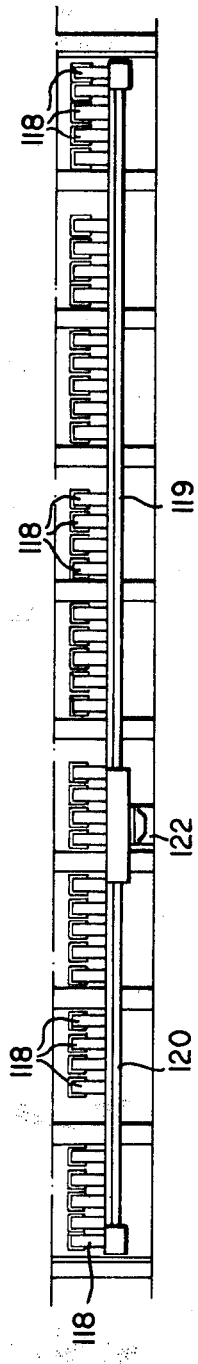
FIG. 23 is a cross-sectional view of the bottom rear end of the grain elevator illustrating part of a grain discharge system.
Figure 17:
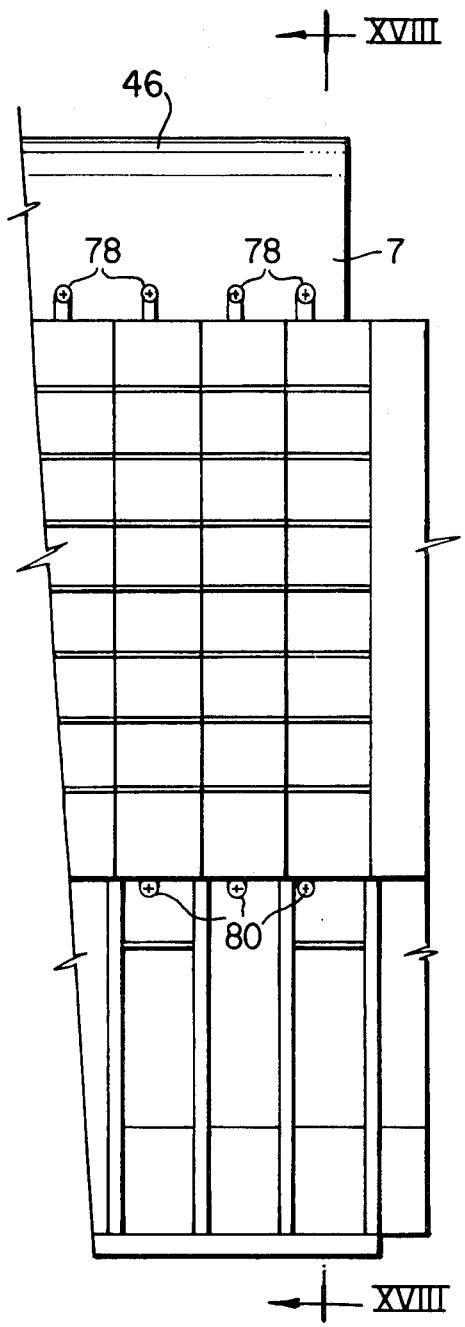
FIG. 17 is a schematic front view of a section of the grain elevator with exterior structural elements removed.
Figure 18:
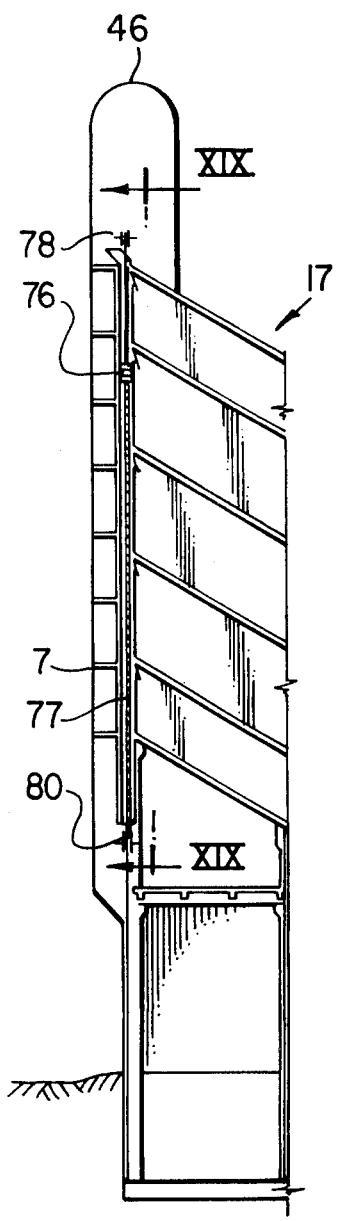
FIG. 18 is a cross-sectional view taken generally along line XVIII—XVIII of FIG. 17, with the parts replaced.
Figure 19:
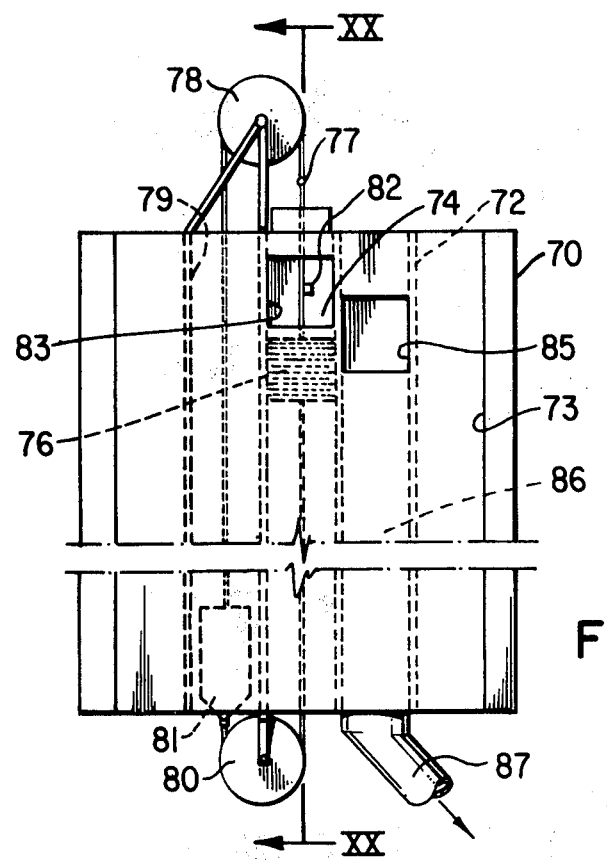
FIG. 19 is a cross-sectional view taken generally along line XIX—XIX of FIG. 18.
Figure 20:
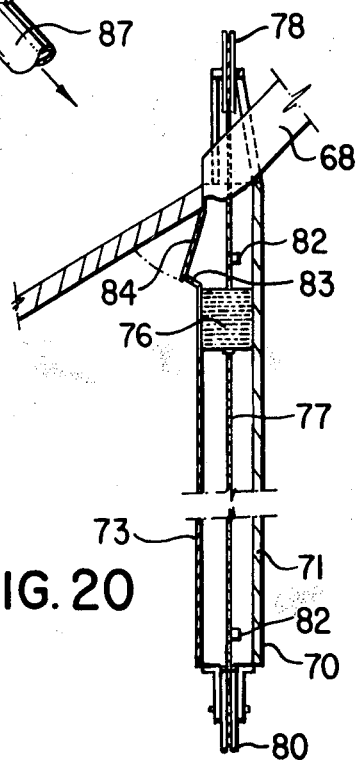
FIG. 20 is a cross-sectional view taken generally along line XX—XX of FIG. 19.

Grain is discharged from the top ends of bucket elevators 44 and 45 via nozzles 48 in top hoods 49 and three-way valves 50. Upon leaving the three-way valves 50, the grain is fed (i) via ducts 51 and a feed box 52 to screw conveyors 53 and 54 in casing 55 for filling all but the central bins 17, (ii) via ducts 56 and a two-way valve 57 to the central vertical row of bins or a truck, (iii) via ducts 58 direct to the screw conveyors 53 and 54. The locations of the front, upper ends of the nine vertical rows of bins 17 are numbered 59 to 67. Grain passing through the ducts 51 and the feed box 52 or through the ducts 58 enters the casing containing the screw conveyors 53 and 54, and is carried by the conveyors 53 and 54 to the top ends of chutes 68. The chutes 68 feed the grain into the rows 59 to 62 and 64 to 67 of bins. The conveyors 53 and 54 are driven at their outer ends. A service platform 69 (FIGS. 12 and 13) is provided at the hood end of the two vertical bucket elevators 44 and 45. Motors 70 for driving the bucket conveyors in the pipes 44 and 45 are mounted on ledges 71 on the sides of the pipes 44 and 45 above the platform 69.

With reference to FIGS. 15 and 17 to 20, the inner front wall is defined by concrete panels 70, each of which includes a planar vertical web 71 and inwardly extending vertical partitions 72. By attaching plywood panels 73 to the inner edges of the partitions 72, a feed manifold containing vertical extending passages is formed. One passage 74 of each manifold in front oe each vertical row of bins is used as a grain feed passage. Grain from a screw conveyor 53 or 54, or from two-way valve 57 passes through a gate 75 (FIGS. 12 and 16) on the bottom of the screw conveyors 53 and 54 and then through chutes 68 downwardly into the top end of passage 74. Each passage 74 is provided with a rectangular plug 76 which substantially fills the passage, preventing the passage of grain. A cable 77 connected to the top end of the plug 76 passes around a pulley 78 mounted above the passage 74 in the cowl 7, downwardly through an adjacent passage 79, around a pulley 80 mounted at the bottom end of the panels 70 and upwardly in the passage 74 to the bottom end of the plug 76. A reversible motor (not shown) is connected to the pulley 78 for moving the plug 76 down or up. Alternatively, the plug 76 can be manually raised or lowered using a handle (not shown) connected to the pulley 80. A counterweight 81 on the cable 77 in the passage 79 facilitates movement of the plug 76. Flags 82 on the cable 77 provide an indication of the location of the plug 76, and may be used to activate sensors or switches as part of an automated control system.

The plywood panels 73 form covers over the upper, front ends of the bins 17. In each vertical row of bins, a feed opening 83 from the passage 74 is provided in the plywood panels 73 at the top end of each bin 17. The feed opening 83 is normally closed by a gate 84. An overflow opening 85 is provided below the top end and above the bottom end of each feed opening 83 in the panels 73. The openings 85 connect the upper end of the bins 17 to overflow passages 86 in the feed manifold adjacent to the feed passages 74. Thus, when a bin 17 becomes filled with grain, the grain overflows through the opening 85 into overflow passages 86. The grain passes downwardly to the lower ends of the feed manifolds where it is discharged through spouts 87 into overflow bins 88 (FIG. 21). Dishcarge ducts 89 at the bottom ends of the overflow bins 88 provided with gates 90 feed the grain back into the bucket elevators 44 and 45 for return to the top of the elevator.

Figure 3:
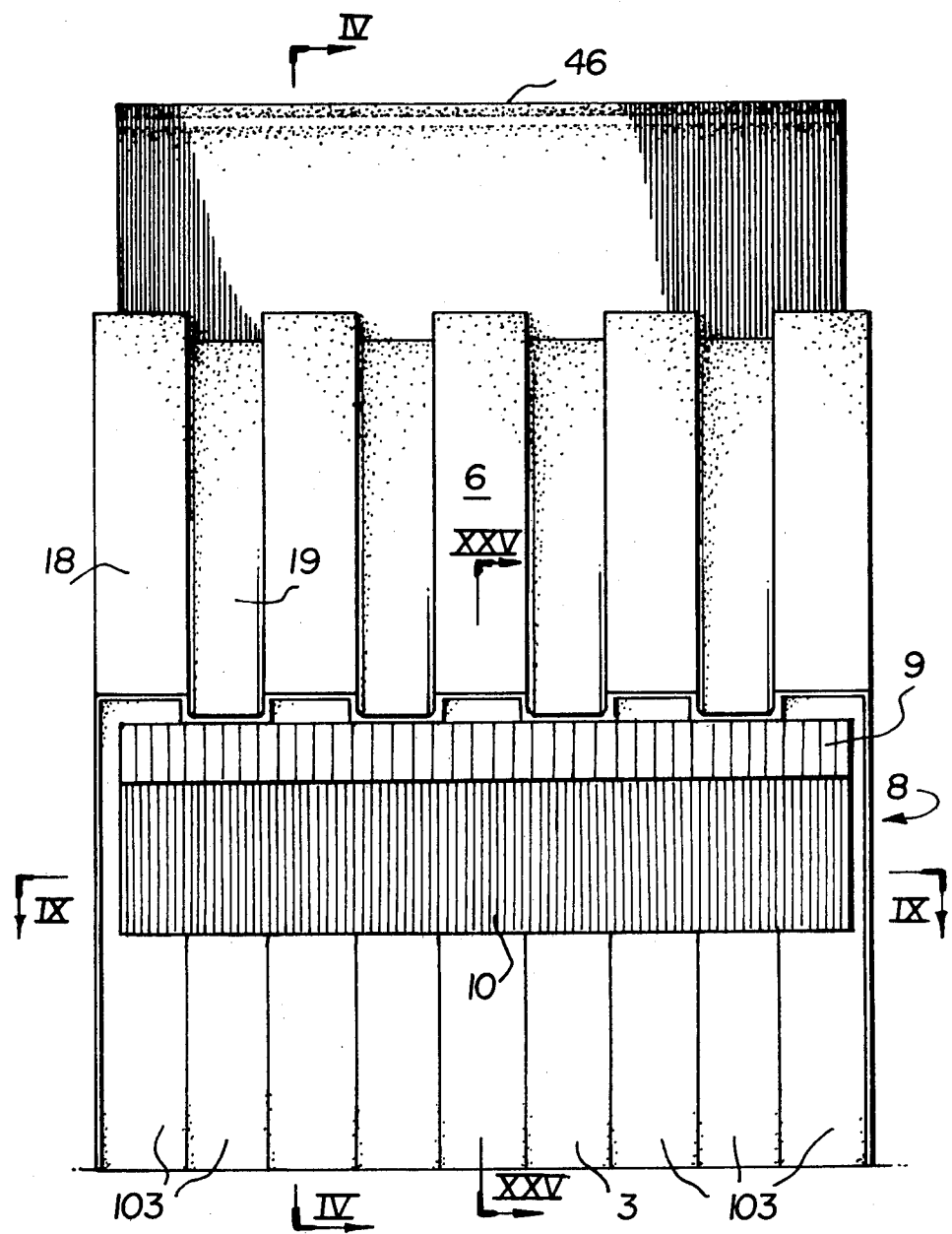
FIG. 3 is a rear view of the grain elevator of FIGS. 1 and 2.
Figure 22:
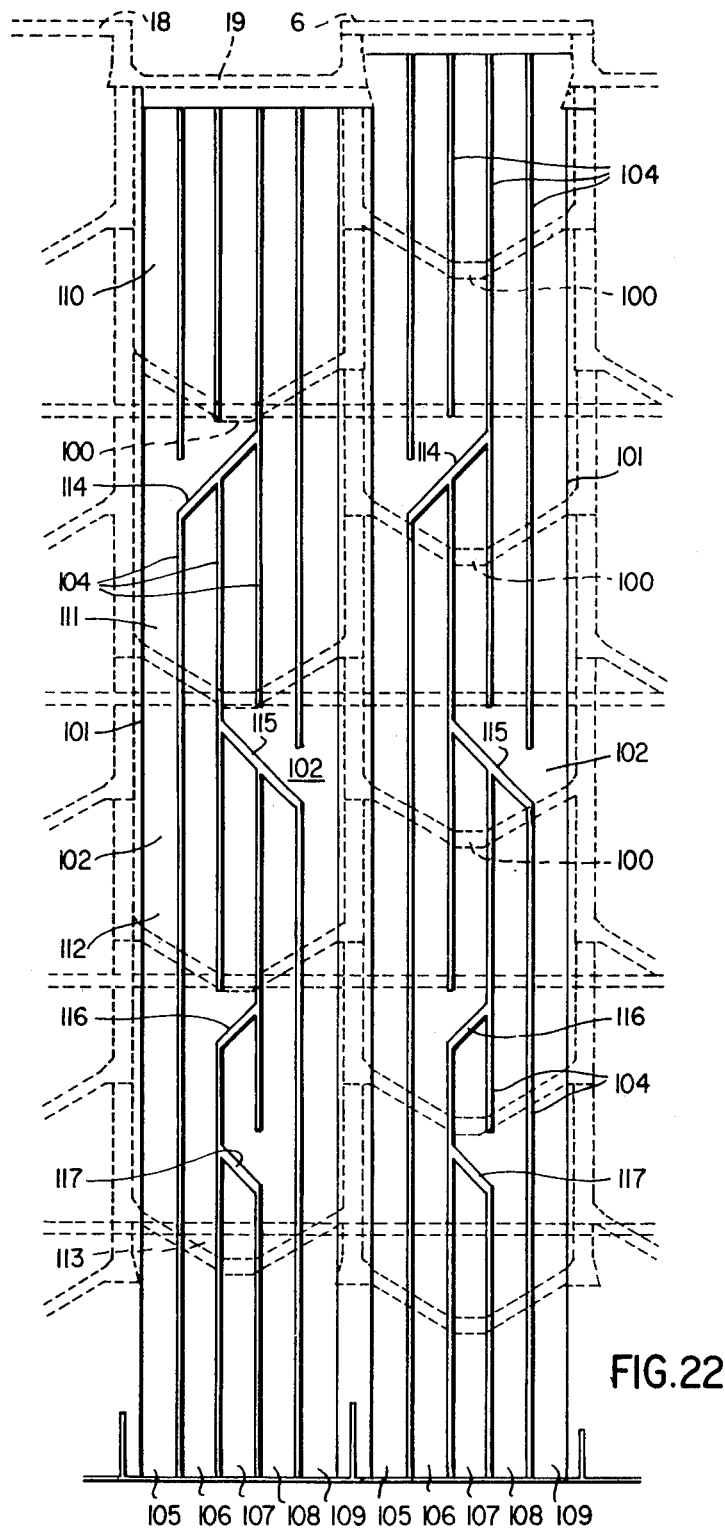
FIG. 22 is a front view of a section of a discharge manifold used in the rear of the grain elevator.

Grain entering the bins 17 flows downwardly from the upper front end thereof to the lower rear end thereof. Upon reaching the lower rear end, the grain slides down a spout 100 on the outer end of the lowermost bin section into a discharge manifold 101 (FIG. 22). The spouts 100, which are formed on the lowermost bin sections only, are merely V-shaped central end portions of the bin sections. Each vertical row 59 to 67 of bins 17 is provided with a discharge manifold 101. The discharge manifolds 101 are somewhat similar to the feed manifolds. Each discharge manifold 101 includes an inner wall panel 102 and an outer wall panel 103 (FIG. 3). Partitions 104 extend between the inner and outer panels 102 and 103, forming discharge passages 105 to 109. In one vertical row of bins, e.g. row 60 or 62, an opening (not shown) in panel 102 from uppermost bin 110 discharges into 105, an opening from the next bin 111 opens into the passage 109, bin 112 opens into the passage 106, and bin 113 opens into the passage 107. In the adjacent row of bins, e.g. row 59 or 61, the bins (from top to bottom) open into passages 105, 109, 106, 108 and 107, in that order. In order to effect the discharge pattern just described diagonal dividing walls 114, 115, 116 and 117 are provided in the manifold 101. The uppermost diagonal wall 114 extends between the third (from the left) vertical partition and the first partition, with a gap between bottom ends of the first and second vertical partitions above the diagonal wall 114 and the top of such diagonal wall. The next diagonal wall 115 extends between the second and fourth vertical partitions in a gap in the third and fourth vertical partitions. The second wall 115 slopes in the opposite direction to the wall 114. The last two diagonal dividing walls 116 and 117 extend between the second and third walls, one inclined in one direction and the other in another direction. The result is gaps in each vertical partition through which grain can flow from one and only one of the bins 17. Grain from the lowermost bin 113 flows downwardly from beneath the lowermost diagonal wall 117 straight out of the lowermost diagonal wall 117 straight out of the lowermost bin through passage 107. In effect, the vertical partitions and diagonal dividing walls define a maze-type discharge manifold, which permits the flow of grain from one bin only. It will be noted that in both cases illustrated in FIG. 22, the chute 100 at the bottom of each bin 17 is aligned with one passage 105 to 109 only.

There is no gate closing the opening at the lower ends of the bins 17, i.e. the bins open directly into the passages 105 to 109. Thus, when the bins 17 are being filled, grain flows downwardly into the manifold 101 and fills discharge spouts 118 (FIGS. 9 and 10) at the bottom ends of the discharge manifold. The spouts 118 extend inwardly to the casings of belt conveyors 119 and 120. A simple slide gate 121 (FIG. 10) is provided at the junction between the bottom end of each spout 118 and the casings of the conveyors 119 and 120. The slide gates 121 are also controlled by the automated control system.

The conveyors 119 and 120 transport the grain inwardly to a shipping belt conveyor 122 (FIGS. 9 to 11 and 23). The conveyor 122 carries the grain forwardly at the bottom of the elevator to a vertical bucket elevator 123, which is beside and parallel to the vertical bucket elevator 45. As shown in FIG. 10, the bucket elevator 123 has two legs 124 and 125 for housing a bucket conveyor (not shown), which moves the grain upwardly to a hood 126 for discharge into a two-way valve 127 (FIGS. 10 and 27). Grain passing through the valve 127 is fed (i) into a pipe 128 for loading a truck outside the front wall 2 of the elevator, or (ii) through a pipe 129 to one of the bins 17, which is designated the shipping bin and is identified by reference numeral 130 in the drawings. Minor discrepancies have been left in the foregoing description of the bins 17 to avoid confusion. The bin 130 is not filled with the other bins, but is used exclusively as a shipping bin. The same applies to top central bin 131, (FIG. 5) which is a discharge bin, as described in greater detail hereinafter.

Grain in the shipping bin 130 is discharged through a bottom gate (not shown) in the bin into a spout 132 for carrying the grain to the scale 36. A gate 133 is provided in the spout 132 for controlling the flow of grain to the scale 36. After weighing, grain is again fed through the receiving bins 41 and 42, returned to the upper top end 46 of the cowl 7, and discharged through the spouts 48, three-way valves 50, ducts 56 and two-way valve 57 to the centre row of bins and then to the top, central discharge bin 131.

Figure 26:
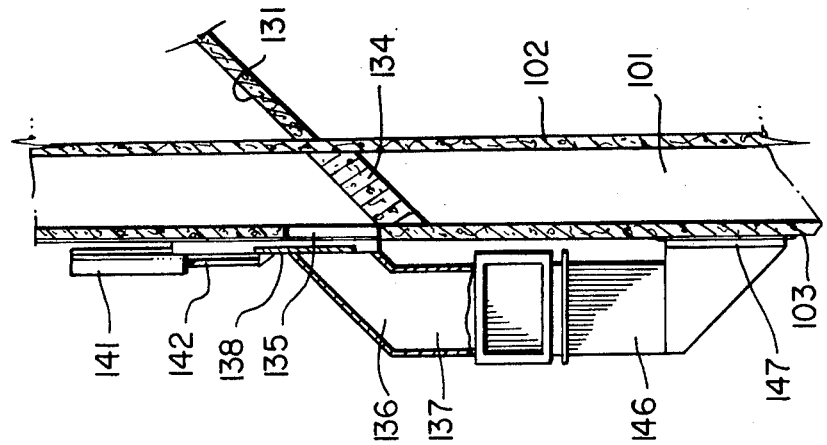
FIG. 26 is a cross-sectional view taken generally along line XXVI—XXVI of FIG. 25.
Figure 25:
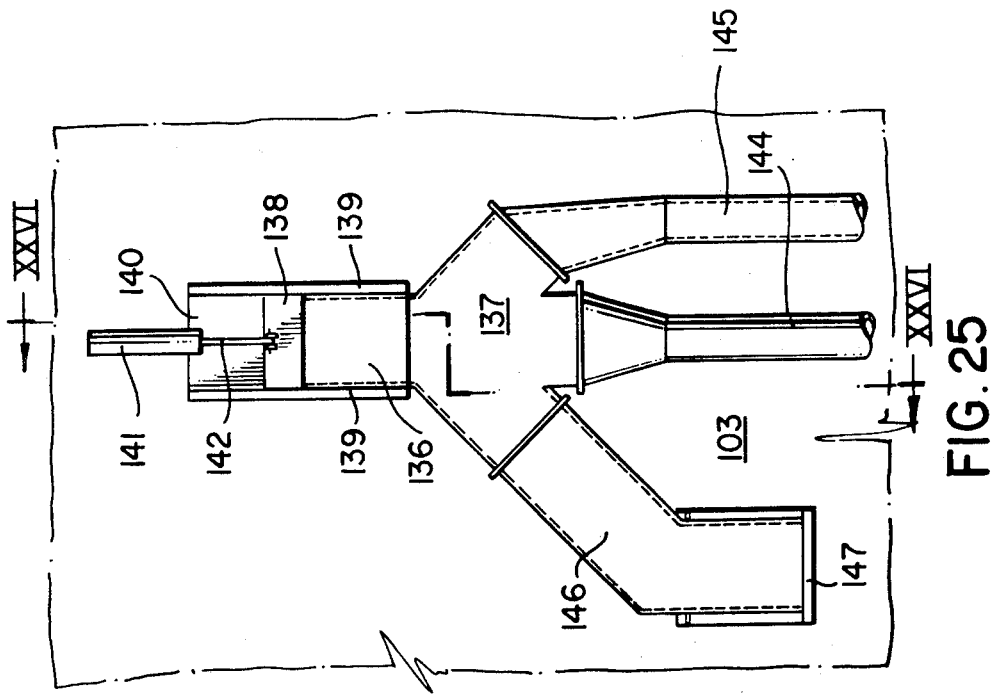
FIG. 25 is a front view of the grain discharge valve of FIG. 24.

As shown in FIGS. 24 to 26, the bottom of the bin 131 at the lower rear end thereo is continued through the manifold 101 to the outer rear wall of the elevator. To this end, a concrete plug 134 is provided in the manifold 101. An opening 135 in the outer wall 103 of the manifold 101 permits the discharge of grain through a chute 136 into a three-way valve 137. The opening 135 is normally closed by a gate 138 slidably mounted in tracks 139 defined by slots in the sides of a guide bracket 140 mounted on the outer wall 103 of the manifold 101. The gate 138 is moved between the open and closed positions by a fluid actuated cylinder 141, the piston 142 of which is connected to the upper end of the gate 138. The three-way valve 137 permits the flow of grain to one of (i) a hopper car 143 (FIG. 24) on the rail siding 16 via an outlet duct 144, (ii) a boxcar (not shown) via an outlet duct 145 or (iii) a passage 105 in the discharge manifold 101 via a spout 146 and an inlet 147.

It should be noted that while the bin 131 (the top centre bin) has been described as the discharge bin, any or all of the top bins in the vertical rows 59, 61, 63, 65 and 67 (FIG. 5) can be used as discharge bins.

Operation

For the most part, the operation of the elevator is described piecemeal in the foregoing. For the sake of completeness, the operation will now be described with reference to FIG. 27.

Grain carried into the elevator in a truck 148 is dumped into receiving pits or bins 41 and 42. From the bins 41 and 42 the grain travels upwardly to the three-way valves 50 at the upper front end of the elevator. From the three-way valves 50, the grain flows through ducts 51 or 58 into the conveyors 53 and 54 for distribution to the bins 17 in vertical rows 59 to 62 and 64 to 67, or through two-way valve 57 to the central row 63 of bins or to a truck 149. The bins 17 are filled sequentially with grain via the feed manifolds. As the bins 17 are filled, the grain also fills the discharge manifolds 101. When the slide gates 121 at the bottom of the spouts 118 are opened, grain is fed onto the belt conveyor 119 and 120. The gates 121 can be opened selectively, i.e. individually or en masse. The conveyors 119 and 120 feed the grain to the shipping conveyor 122, which carries the grain to the vertical bucket elevator 123. From the bucket elevator 123, the grain enters the shipping bin 130, and is transferred to the scale 36 for weighing. The grain then travels back to the receiving bins 41 and 42, through bucket elevators 44 and 45 to the top front end of the elevator, and through the ducts 56 to a feed box 57. From the feed box 57, the grain enters the discharge bin 131, and from the bin 131, the grain passes through the three-way valve 137 to a hopper car 143 or a boxcar 151.

SUMMARY

There has thus been described a modular elevator for grain or other granular material formed predominantly of pre-cast concrete. The elevator is capable of extremely high throughput, is flexible in terms of capacity, and is relatively efficient.

While not mentioned hereinbefore, the slope of the bins may be important depending on the type of material being stored in the elevator. The usual slope of the bins is 30°. However, any slope above 22.5° is acceptable for filling, the preferred range of slope being 22.5° to 30°. Emptying can be effected over a wide range of slopes, except that a thin layer of grain is left on the bin floor with lesser slopes. If left in the bins, such grain could contaminate the subsequent contents of the bins. Dry barley left no residue for slopes exceeding 28°, but tough barley requires a slope of approximately 30.5° to completely clear the residue. Since tough barley is wetter than would be accepted, a slope of 30° should be adequate.

In practice, the structure described hereinbefore and illustrated in the drawings is intended to have a storage capacity of approximately 206,000 bushels. Additional modules can be added either during or after construction to increase the capacity of the elevator. The first such additional module would be added at the front of the base structure to increase storage capacity and provide a second driveway with a second receiving scale. Additional modules of approximately 55,000 bushel capacity could be added to either end of the elevator. The possibility of expanding the elevator makes the building suitable for handling grain in any farm community.

Additional features of the invention described hereinbefore include the fact that grain cars can be loaded relatively quickly. Moreover, unlike conventional elevators, virtually all bin space is utilized. The use of a pre-cast structure is relatively adaptable. By suitable arrangement of transfer equipment, i.e. the loading and unloading devices, entirely different commodities such as grain and bulk fertilizer can be handled in a single elevator in much the same manner as they would be handled in separate structures. The use of sloping bins in the elevator eliminates overpressures due to charging and discharging.

While they have not been described in detail because they do not form part of the present invention, cleaning and drying equipment, and office, warehouse and retail space are provided in the lower part of the elevator.

While the elevator is no bigger than a conventional double composite 170,000 bushel capacity elevator, it is still capable of storing 206,000 bushels of grain. The manager of the elevator can carry out all elevator business from one central location. Such business includes the weighing and receiving of grain, operating elevator controls, and sales. By maintaining the air pressure in the office and warehouse areas higher than in the driveway, an acceptable dust-free environment can be maintained.

Finally, the elevator structure is designed to reduce the danger of fire or explosion to a minimum. The use of pre-cast concrete sections closed by concrete panels at each end is important. An explosion in one bin could break the wall panel at the end of such bin free of the remaining structure, and, if enough force was generated, blast the panel through the metal siding. However, if a fire or explosion occurs in one area, damage is restricted to such area and does not readily spread to the remainder of the elevator. What I claim is:

1. A module for constructing an inclined bin comprising a rectangular body constructed as a parallelogram devoid of right angel corners, said body being defined by a bottom wall and side walls integral with said bottom wall; a bearing block at each end of and integral with each side wall; each bearing block having sides parallel to the ends of the rectangular parallelogram body, and top and bottom ends inclined with respect to said bottom of said body and perpendicular to ends of said side walls of the body, whereby, when like modules are stacked vertically the bearing blocks are vertically oriented and the bins defined thereby are inclined.

2. A module according to claim 1, including connector means for interconnecting a bearing block in one vertical row with a bearing block above or below in the same vertical row.

3. A module according to claim 2, wherein said connector means includes a recess in one end of each bearing block and a pin in the other end thereof for mating with the recess in a superjacent or subjacent bearing block.

* * * * *